Feb. 27, 1962 W. G. NIXON 3,023,173
MANUFACTURE OF CATALYST
Filed April 29, 1959
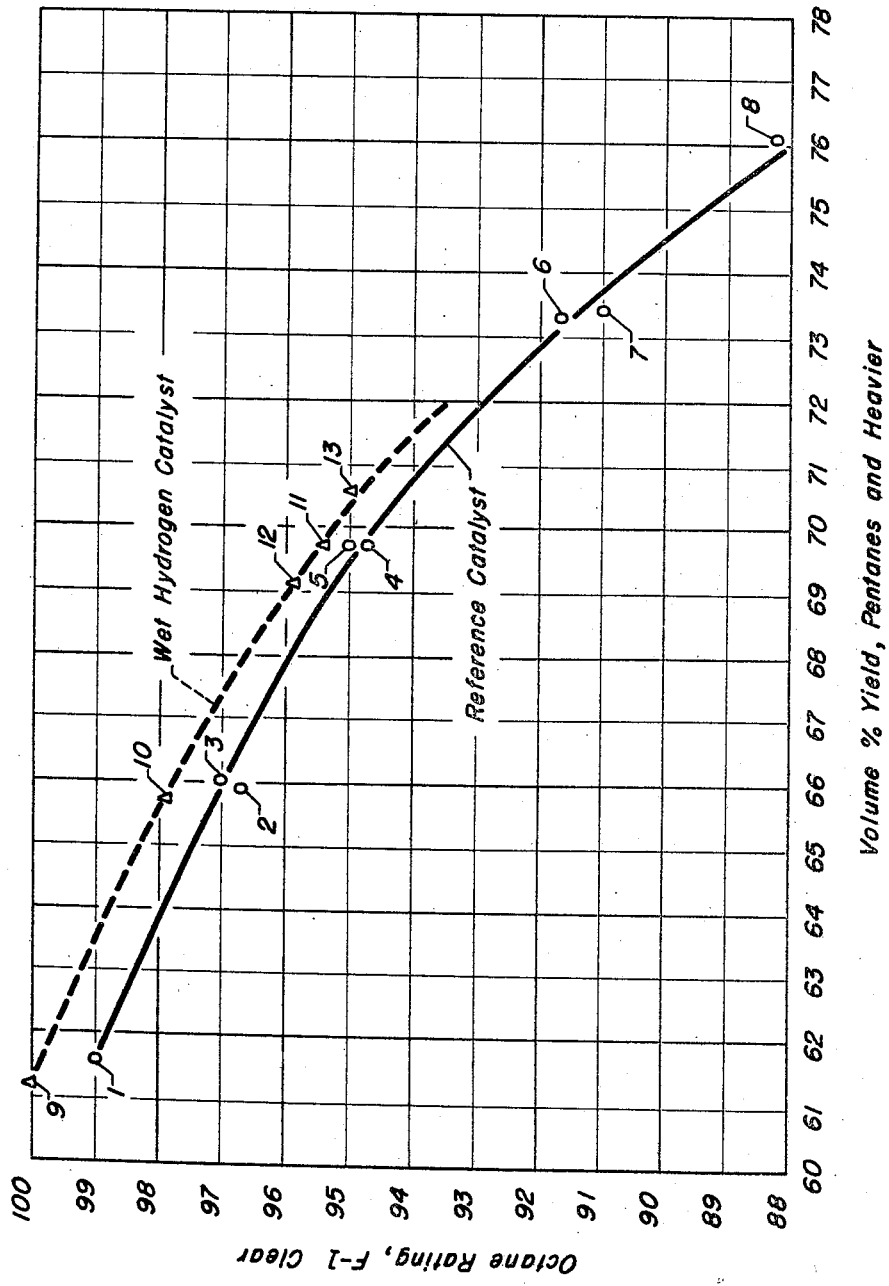
INVENTOR:
William G. Nixon
BY:
Chester J. Giuliani
Philip T. Liggett
ATTORNEYS United States Patent Office 3,023,173
Patented Feb. 27, 1962

3,023,173
MANUFACTURE OF CATALYST
William G. Nixon, Westchester, Ill., assignor to Universal Oil Products Company, Des Plaines, Ill., a corporation of Delaware
Filed Apr. 29, 1959, Ser. No. 809,634
6 Claims. (Cl. 252—466)

The present invention, in its most broad scope, relates to the manufacture of refractory inorganic oxides, and particularly to the manufacture of refractory inorganic oxides for utilization in the preparation of various catalytic composites. More specifically, the present invention is directed toward an improvement in processes for the manufacture of alumina, which improvement produces alumina particles having improved physical characteristics. When subsequently employed in the preparation of catalytic composites, such as an alumina-platinum catalyst, the alumina particles manufactured in accordance with the method of the present invention yield a catalytic composite possessing an unexpected degree of activity, as well as stability—the capability to perform its intended function for an extended period of time.

Through the use of the method of the present invention, a refractory inorganic oxide is produced which is particularly adaptable to utilization as a carrier material in the manufacture of catalytic composites, or as an absorbing or desorbing medium when employed as a desiccant, or other treating or purifying agent. When ultimately employed as the carrier material for catalytically active metallic components, the inorganic oxide is especially suited for use in processes for the catalytic reforming and isomerization of hydrocarbons and mixtures thereof, and is advantageously employed in processes for the catalytic or thermal cracking of hydrocarbons.

Refractory inorganic oxides are widely employed throughout many types of commercial industries; they are extensively utilized in the chemical and petroleum industries as a carrier material for catalytically active metallic components, or, in a few isolated instances, as a catalyst in and of themselves, as in high-temperature cracking processes. Inorganic oxides, including alumina, silica, magnesia, thoria, boria, titania, zirconia, etc., and mixtures thereof, are generally employed, without the addition thereto of catalytically active metallic components, as dehydrating, desorbing, treating, adsorbing, and purifying agents. The inherently high degree of porosity, possessed by refractory inorganic oxides, is one of the more prominent factors affecting the extensive use in removing solid contaminants from liquid and gaseous streams, liquid contaminants from gaseous streams, etc. The refractory oxides most frequently employed, in view of their high adsorptive capacity, are alumina, silica and mixtures thereof. The addition of other refractory inorganic oxides, a representative number of which are hereinabove set forth, is generally effected in processes for manufacturing catalytic composites for the primary purpose of imparting thereto certain desired physical and/or chemical characteristics. These characteristics, in turn, are designed to induce particular effects upon the wide variety of reactions which are to be promoted.

Regardless of the intended use, it is necessary that the refractory inorganic oxide possess certain characteristics, both physical and chemical. When intended for use as a treating or purifying agent, the inorganic oxide should be highly porous; when used in conjunction with catalytically active metallic components, to effect various chemical reactions, the inorganic oxide must be physically capable of yielding a final catalytic composite possessing a high degree of activity, as well as stability; when the process in which the inorganic oxide is ultimately employed, is of the moving, or fluidized-bed type, it must possess a high degree of peripheral crushing strength in order to resist deterioration as a result of crushing, erosion, leaching, abrasion, etc.

The object of the present invention is to produce a refractory inorganic oxide, and particularly alumina, possessing a high degree of peripheral crushing strength, without the usual accompanying loss in porosity or adsorptive capacity, and at the same time, being physically capable of yielding a catalytic composite of unusually high activity and stability.

In its most broad embodiment, the present invention relates to a method for manufacturing a refractory inorganic oxide which comprises preparing refractory inorganic oxide particles, drying said particles at a temperature less than about 212° F. and contacting the resultant dried particles with moist hydrogen.

In another embodiment, the present invention provides a method for manufacturing alumina which comprises preparing alumina particles, drying said particles at a temperature less than about 212° F. and contacting the resultant dried particles with a stream of moist hydrogen, containing from about 5.0 mol percent to about 20.0 mol percent water, to a temperature in excess of 400° C., and thereafter subjecting said alumina particles to high-temperature calcination in an atmosphere of air.

In its most specific embodiment, particularly directed to the use of the refractory inorganic oxide as the carrier material for catalytically active metallic components, the present invention affords a method for manufacturing a catalytic composite comprising alumina and platinum, which method comprises preparing alumina particles, drying said particles at a temperature less than about 212° F., contacting the resultant dried alumina particles with a stream of moist hydrogen, containing from about 5.0 mol percent to about 20.0 mol percent water, to a temperature in excess of 400° C., subjecting the thus hydrogen-treated alumina particles to high-temperature calcination in an atmosphere of air, impregnating the resultant calcined alumina particles with a platinum-containing compound to yield a final catalytic composite containing from about 0.1% to about 2.0% by weight of platinum, and thereafter calcining the impregnated alumina particles at a temperature in excess of about 400° C.

When utilized as a carrier material for catalysts containing one or more catalytically active metallic components, the refractory inorganic oxide, and particularly those comprising alumina, prepared in accordance with the present invention, yields a more active catalyst than has heretofore been obtained. This high degree of activity renders the catalytic composite especially suitable for use in the chemical and petroleum industries for the purpose of promoting a multitude of reactions including hydrogenation, sulfonation, alkylation, hydrocracking, oxidation, cyclization, dehydrogenation and, under particular conditions of operation and catalyst composition, isomerization. In addition, the catalyst exhibits a high degree of stability—the capability of performing its intended function over an extended period of time, without the necessity for instituting frequent regenerations thereof. This increased activity and stability appears to be due, at least in part, to the resulting physical state of the inorganic oxide particle, following the use of moist hydrogen, whereby the structure of the particle is affected in such a manner as provides a more thorough, as well as more uniform, penetration by the particular compound employed as the source of the catalytically active metallic component. Whatever catalytically active metal components are combined with the inorganic oxide, the result is a more homogeneous catalyst, and one in which the active metallic components are more thoroughly integrated throughout the individual particles. Other beneficial aspects derived through the use of moist hydrogen are hereinafter described.

Another object of the present invention is to provide an active metal-containing catalytic composite which, due to the high degree of homogeneity in regard to its composition, is possessed of the degree of activity required in order to result in high yields of the desired end product, and the requisite stability to enable the catalyst to perform its intended function for extensive periods of time without the necessity of involved, tedious regeneration.

Although the method of the present invention is applicable to the manufacture of a variety of refractory inorganic oxides, examples of which have been hereinbefore set forth, in the interest of simplicity and brevity, the following discussion is limited to the manufacture of alumina, and particularly alumina to be subsequently employed as the carrier material in the manufacture of catalytically active composites. It is understood, however, that the method of the present invention may be utilized to advantage in the preparation of refractory inorganic oxides possessing high adsorptive capacity and peripheral crushing strength, whether alumina, alumina-silica, silica, or other refractory inorganic oxides either alone, or in combination with the alumina and/or silica. In the present specification, as well as the appended claims, the term "alumina" is employed to mean aluminum oxide in all states of oxidation and in all states of hydration, as well as aluminum hydroxide. The alumina may be either synthetically prepared, or naturally occurring, or of the crystalline or gel type. Alumina exists in a variety of physical modifications, which are known as alpha-alumina, gamma-alumina, and epsilon-alumina, and which are of the mono- or tri-hydrate form, and it is intended to include all such modifications.

The alumina, to be improved through the utilization of the method of the present invention, may be manufactured in accordance with any of the well-known, suitable methods of manufacture, none of which are considered essential to the present invention. Alumina may be prepared, for example, by adding a suitable alkaline reagent such as ammonium hydroxide to a salt of aluminum metal, such as the chloride, the sulfate, the carbonate, etc., in an amount to form aluminum hydroxide which, upon drying and calcining in a free oxygen-containing atmosphere, is converted to alumina. Other refractory inorganic oxides, particularly silica, may be added to the alumina in any suitable manner including separate, successive or coprecipitation means. Although alumina is manufactured in a variety of shapes, such as pills, granules, cakes, spheres, extrudates, etc. a preferred form of alumina is the sphere. When in the form of spheres, the alumina may be continuously manufactured by the oil-drop method which consists of passing droplets of a suitable aluminum-containing hydrosol into an oil bath maintained at an elevated temperature, retaining the droplets within said oil bath until they set to firm hydrogel spheroids. The spheroids are continuously withdrawn from the oil bath, and immediately thereafter subjected to particular aging treatments for the purpose of imparting thereto certain desired physical characteristics. It is not essential to the method of the present invention that the alumina be prepared in any particular manner, nor that the alumina exist in any special physical shape; the methods of preparation, and the various forms of alumina hereinabove set forth, are intended to be illustrative rather than restrictive upon the present invention. The term "particle" employed herein, and in the appended claims, is intended to denote any shape taken by the alumina prior to the specific treatment which constitutes the present invention.

The method of the present invention is particularly applicable to the manufacture of catalytic composites containing noble metal components, especially platinum; however, other noble metals, such as iridium, palladium, rhodium, and ruthenium, and catalytic composites containing other metals can be manufactured advantageously through its use. Other metals can be composited with the refractory inorganic oxide and subsequently employed therewith as catalytically active components of the catalyst. Catalytic composites which can be manufactured to a high degree of activity and stability, through the incorporation of the method of the present invention, comprise metallic components such as, but not limited to, vanadium, chromium, tungsten, cobalt, copper, sodium and other alkali metals, silver, rhenium, molydenum, nickel, cesium, other metals of groups VI and VIII of the periodic table, mixtures of two or more, etc. The metal component may exist either in the elemental state or in combination as the halide, oxide sulfide nitrate, sulfate, etc. It is understood that the benefits afforded catalysts containing different metal components are not equivalent, and that the effects of employing the method of the present invention with a particular metal component, or components, are not necessarily the same effects observed in regard to some other metal component, or mixture of metal components.

Generally, the amount of the noble metal component, composited with the catalyst, is comparatively insignificant with respect to the quantities of the other components combined therewith. For example, platinum and/or palladium and other noble metals will generally comprise from about 0.01% to about 5% by weight of the total catalyst, and usually from about 0.1% to about 2.0% by weight. The use of other metal components is generally dependent upon the specific use for which the particular catalyst is intended. In any case, however, the concentrations of the metal components will be small; the total concentration of active metal components being within the range of about 0.01% to about 10% by weight.

Halogen is generally composited with the catalyst in concentrations of from about 0.1% to about 8% by weight of the total catalyst (computed on a dry basis, and as the elemental halogen), and may be either fluorine, chlorine, or mixtures of the same. Fluorine appears to be possessed with a high degree of tenaciousness, and is less easily removed from the catalyst during the process in which the same is employed; it is, therefore preferred in many instances. The halogen is combined with one or more of the other components of the catalylst, and is, therefore, generally referred to as combined halogen. The combined halogen serves to provide an acid-acting function to the final catalytic composite, and in this respect, fluorine and chlorine are considered practically equivalent, although, as hereinabove stated, fluorine is preferred due to its ability to remain composited with the other catalytically active components during the operation of the process in which it is employed.

The halogen may be added to the alumina in any suitable manaer, and either before or after the addition thereto of the other catalytic components. While halogen is added as gaseous chlorine or fluorine, in some instances it is often added as an aqueous solution of a hydrogen halide. The halogen is often added to the refractory oxide before the other components are composited therewith, and this may be accomplished through the use of an aqueous solution of an acid such as hydrogen fluoride and/or hydrogen chloride. In some cases, volatile salts such as ammonium fluoride, ammonium chloride, etc. are employed. In other instances, the alumina is prepared from an aqueous solution of the aluminum halide, which method affords a convenient manner of compositing the halogen while at the same time, manufacturing the alumina. Halogen may also be composited with the alumina during the impregnation of the latter with the active metallic component.

The essential feature of the present invention is the utilization of moist hydrogen in the process of manufacturing refractory inorganic metal oxides, and particularly alumina; the ultimate use, for which the metal oxide is intended, is not considered to be a limitation upon the broad scope of the present invention. The method of the present invention insures completely uniform distribution of the catalytic components within and throughout the carrier material, thereby unexpectedly yielding a catalytic composite of greater activity and stability, and for this reason, is especially adaptable to the manufacture of catalysts. The exact nature of the phenomenon, effected through the action of moist hydrogen, resulting in the beneficial change in the structural characteristics of the inorganic oxide, is not known precisely. It has been shown, as will hereinafter be set forth, that the treatment with moist hydrogen yields a refractory inorganic oxide with significantly improved peripheral crushing strength, and surface-area characteristics, such that the inorganic oxide is more suitable for use as a carrier material for the manufacture of catalysts. Preferably, the inorganic oxide is contacted, in accordance with the method of the present invention, with moist hydrogen prior to subjecting said inorganic oxide to a high-temperature calcination treatment. In general, most of the methods of manufacture presently employed, yield a refractory inorganic oxide which is substantially saturated with water, both free and combined. The oxide is necessarily dried, usually at temperatures within the range of about 25° C. to about 100° C. and calcined, in the presence of air, at substantially elevated temperatures of about 100° C. to about 700° C., and often at higher temperatures. The preferred method of the present invention is to cause the visually dry refractory inorganic oxide to contact the moist hydrogen prior to subjecting the inorganic oxide to the high-temperature calcination. High-temperature calcination is employed for the purpose of permanently fixing the physical state of the alumina. Similarly, in the manufacture of catalytic composites, following the impregnation procedure, the catalyst is subjected to high-temperature calcination in order to obtain a physical and chemical combination, of the alumina and the various catalytic components, which is relatively resistant to change. The method of the present invention is to contact the alumina with moist hydrogen prior to high-temperature calcination, to enhance the structural changes being effected by such treatment.

The length of the moist hydrogen treatment, as well as the total quantity of hydrogen which is passed through the inorganic oxide in contacting the same, is dependent upon the quantity of material to be so treated, the means employed to disperse the moist hydrogen throughout the refractory material, and other similar intangible variables. It appears that there exists a finite stage, during the treatment with moist hydrogen, at which a maximum change in the structural characteristics of the inorganic oxide has taken place. Any further treatment appears to be uneconomical and no advantage is foreseen in employing an excessive quantity thereof. Upon considering the intangible variables hereinabove set forth, it is a relatively simple matter for one skilled in the art to determine both the quantity of hydrogen to be employed and the length of the treatment. It is believed that the duration of the treatment with moist hydrogen need not exceed the interval during which the temperature of the alumina is increased from 100° C., the temperature at which the drying treatment is effected, to a level in excess of 400° C. Thus, when the alumina is visually dried, moist hydrogen is passed therethrough, the temperature being increased to a level in excess of 400° C., and at a rate to prevent the sudden rupture of the alumina particles. When the temperature reaches 400° C., the moist-hydrogen flow is stopped, and the alumina is then subjected to high-temperature calcination. In those instances where the alumina is to be employed as the carrier material for catalytically active metal components, the high-temperature calcination may be omitted until after the alumina has been impregnaed with the metal component.

As hereinbefore stated, the particular means by which the inorganic oxide particles are prepared is not limiting upon the method of the present invention. The following description of the specific embodiment, involving the manufacture of alumina spheres, is understood to be solely for the purposes of illustration. It is further understood that the broad scope of the present invention is not intended to be unduly limited thereto, and that the present invention affords exceptional benefits to the manufacture of a multitude of refractory inorganic oxides, a representative number of which have been previously described.

The alumina spheres, which may or may not contain combined halogen, are placed in a suitable vessel in which they are disposed while the various treatments are being effected. The drying treatment, moist-hydrogen treatment and the subsequent calcination treatment are readily carried out by causing the various gaseous material to pass through the vessel either upflow, downflow, or crossflow. In some instances, the alumina spheres may be placed on a moving belt, and the gaseous material caused to pass over, under and through the spheres while the latter are disposed on the belt. I prefer to have the alumina spheres, or other shaped particles, disposed within an enclosed vessel, wherein the gaseous material is passed downwardly through the particles.

As hereinbefore stated, the alumina particles generally contain excessive water, either physically free, or existing in some chemically combined form, following the last manufacturing procedure prior to the high-temperature calcination. Therefore, in accordance with the method of the present invention, the wet alumina particles are visually dried at a temperature less than about 100° C., and over a period of time sufficient to prevent the sudden, rapid evolution of water vapor inherently resulting in ruptured particles. When the particles have been thoroughly dried, they may be stored for future use or immediately contacted with the stream of moist hydrogen. The moist-hydrogen treatment is effected to a temperature in excess of about 400° C., having an upper limit of about 600° C., and the temperature must necessarily be increased following the drying procedure, and while the hydrogen is flowing through the alumina particles. The hydrogen stream contains water in an amount of about 5.0 mol percent to about 20.0 mol percent, which amount is readily controlled within the stated range by passing dry hydrogen over or through water at a given temperature. Hydrogen passing through water at a temperature of 40° C., contains 7.3% water; if the temperature of the water is increased to 60° C., the moist hydrogen will contain about 20% water. Following the treatment with moist hydrogen, the alumina particles are subjected to a high temperature calcination procedure in an atmosphere of air. It is preferred that the particles be contacted, or swept, with a suitable inert gas, such as nitrogen, following the moist hydrogen treatment and prior to the calcining procedure. The calcining is effected at a temperature within the range of from about 400° C. to about 650° C., and in some instances at a temperature as high as about 800° C.

As hereinbefore set forth, and hereinafter illustrated in greater detail, the method of the present invention, as briefly described above, results in alumina particles which are possessed with a substantially greater degree of peripheral crushing strength. This particular physical property affords many advantages in those instances where the alumina is employed in processes in which the alumina particles are subjected to excessive transportation, such as fluidized-bed processes. The alumina particles possess a high degree of resistivity to abrasion, crushing, etc. In addition, as hereinafter illustrated in a specific example, the alumina particles, following the treatment in accordance with the method of the present invention, exhibit a propensity for forming highly active and highly stable catalytic composites when combined with catalytically active metallic components, and particularly when combined with a noble metal component for the purpose of providing a hydrocarbon conversion catalyst.

The following examples are introduced to further illustrate the utility of the present invention, and to indicate the benefits afforded through the use thereof. They are not intended to limit the invention to the specific material, conditions and/or concentrations involved therein. The catalytically active carrier material, employed in the examples, was alumina spheres containing combined fluoride. This composite was prepared by the oil-drop method from a mixture of equal volumes of a 28% by weight solution of hexamethylene tetraamine in water and an aluminum chloride hydrosol containing about 12% by weight of aluminum and 10.8% by weight of combined chloride. Where indicated in the examples, when stating the composition of the catalyst, the fluorine was added by way of an aqueous solution of hydrogen fluoride, the mixture then being formed into hydrogel spheroids: The spheres were washed and dried to a temperature of 100° C.

EXAMPLE I

A 130-gram portion of $\frac{1}{16}$-inch alumina spheres, prepared in accordance with the oil-drop method above described, and which spheres had not been subject to a high-temperature calcination treatment, was dried at a temperature of about 210° F. The dried spheres were placed in an elongated glass tube, being held in place by a perforated stainless steel support. Dry hydrogen, at a rate of 300 cc. per minute, was passed through water at a temperature of 60° C. Thereafter, the moist hydrogen, containing 20% by weight of water, was passed through the $\frac{1}{16}$-inch alumina spheres to a temperature of 500° C., and for a period of one hour at that temperature. The hydrogen-treated alumina spheres were then subjected to calcination in an atmosphere of air at a temperature of 650° C. for a one hour period. The thus treated alumina particles were designated as sample "A."

Following the calcination treatment at elevated temperature, the spheres were subject to a standard test procedure to determine the peripheral crushing strength thereof. The average peripheral crushing strength of aluminum particles is determined as the arithmetic average of the force required to crush each particle of a given number of individual particles. Each particle is crushed in an apparatus constructed in such a manner that the force is applied continuously and at a uniform rate beginning with a zero load.

The crushing strength apparatus consists essentially of a balance beam resting on a knife edge. The knife edge is located at unit distance from an anvil on which the alumina particle is placed. A cup, which receives the lead shot by which the load is applied, is located on the other side of the knife edge, four times the unit distance therefrom. The lead shot falls into this cup from a hopper at a rate of about 9 pounds per minute, thus loading the alumina particle at a rate of 36 pounds per minute. A single particle is placed on the anvil of the apparatus, and the beam balanced by means of a small spirit level. Force is applied to the particle by opening the shutter in the bottom of the hopper containing the lead shot, thus allowing the shot to flow in a continuous stream into the cup. The flow of lead shot is immediately, and automatically, cut off when the particle is completely crushed. The weight of lead shot within the cup is multiplied by a factor of 4 to give the actual peripheral crushing strength of the particle. The procedure is repeated 60 times and the crushing strength taken as the arithmetic average of the observed individual crushing strengths.

A second portion of $\frac{1}{16}$-inch alumina spheres, prepared by the oil-drop method, while still existing in a wet state, were placed in the elongated glass tube and dry hydrogen passed therethrough to a temperature of 500° C. These alumina particles are designated as sample "B." A third portion of alumina particles, designated as sample "C", and prepared in accordance with the oil-drop method, was subjected to calcination at a temperature of 650° C. Sixty spheres of each of alumina samples B and C were subject to the determination of the peripheral crushing strength as hereinabove described. The results of the crushing strength test for the three alumina portions, "A", "B" and "C", are given in the following abbreviated Table I.

*Table I*

PERIPHERAL CRUSHING STRENGTH

| Sample designation | A | B | C |
| --- | --- | --- | --- |
| Number particles tested | 60 | 60 | 60 |
| Average crushing strength, lbs | 12.7 | 7.9 | 9.4 |
| Percent of particles less than 5 lbs | 1.6 | 10.0 | 11.7 |

It is immediately noted that the alumina particles prepared in accordance with the method of the present invention have an average peripheral crushing strength of more than 3 pounds greater than the crushing strength observed on the alumina particles prepared in the absence of moist hydrogen. Similarly, where dry hydrogen was employed on the wet spheres, sample "B", the average crushing strength was almost 5 pounds lower than that observed on sample "A", which had been prepared utilizing moist hydrogen and the dried, uncalcined spheres. It is significant that the percentage of relatively weak particles was only 1.6% (one particle out of sixty tested) of the particles prepared by the method of the present invention, whereas as high as 10–11% of the particles comprising samples "B" and "C" were relatively weak.

EXAMPLE II

A 130-gram portion of $\frac{1}{16}$-inch calcined alumina spheres, prepared in accordance with the oil-drop method previously described, was commingled with 99 milliliters of an aqueous solution of chloroplatinic acid containing 10 milligrams of platinum permilliliter plus 60 milliliters of water. The resulting mixture was evaporated to dryness over a water bath at a temperature of 99° C., and further dried in a rotary dryer for a period of three hours. The chloride concentration was reduced to a level of 0.31% by weight, and the impregnated catalytic composite was then subjected to a high temperature calcination treatment in an atmosphere of air, for one hour at a temperature of 500° C. The catalyst was subjected to a particular activity-stability test which consistetd of passing a hydrocarbon charge stock, having a boiling range of about 234° F. to about 370° F., and a gravity, °API, or 61.2 at 60° F. This hydrocarbon charge stock, containing 82% by volume of paraffins, was passed through the catalyst at a liquid hourly space velocity (volumes of hydrocarbon charged per volume of catalyst) of about 2.0, in an atmosphere of hydrogen present in a mol ratio of hydrogen to hydrocarbon of 10:1 and for a period of about ten hours. The reaction zone was maintained at a temperature of 500° C., and under an imposed pressure of 500 pounds per square inch. The reaction zone was cooled and depressured at the end of the ten hour period; the catalyst portion was removed, and analyzed for carbon deposition. It has been shown that highly active catalysts will quite often exhibit excellent results during the initial stages of operation, but are insufficiently stable and, therefore, rapidly lose the capacity to function acceptably for an extended period of time: The carbon deposition during the test period indicates the relative stability of the catalyst. The liquid product collected from the reaction zone, over the entire ten hour period, was analyzed for octane rating (F–1 clear). This catalyst portion is representative of platinum-containing catalysts comprising a given quantity of platinum, and is employed as the reference catalyst for comparing the results obtained from different catalysts manufactured by a variety of methods. The catalyst was employed to compare the results of the catalysts manufactured according to the present invention, and is designated in Table II as catalyst "5." The yield-octane relationship resulting through the use of this catalyst is also indicated in the accompanying figure as data point 5.

A second catalyst portion was prepared strictly in accordance with the procedure as hereinabove set forth with respect to catalyst "5." This second catalyst portion was subjected to a series of the previously described activity-stability tests, in which series the operating conditions, liquid hourly space velocity and/or the operating temperature, were varied. For each individual test of the series, the volumetric yield of pentanes and heavier hydrocarbons was determined, and F–1 clear octane ratings obtained on this particular portion of the total reformed product. The results of this series of the activity-stability test are illustrated, in part, in the accompanying figure. That part which is shown is the relationship between the volumetric yield of reformed product comprising pentanes and heavier hydrocarbons, and the octane rating (F–1 clear) of this particular portion. This data is indicated in the drawing as datum points 1, 2, 3, 4, 6, 7 and 8, in addition to data point 5, through which points is drawn the solid curve referred to as "reference catalyst." It is immediately ascertained that this curve conforms to the basic theoretical principle that an increase in octane rating necessitates an increase in operating severity which, in turn, results inherently in a substantial decrease in the volumetric yield of product having the increased octane rating.

Two catalyst portions were prepared utilizing alumina spheres prepared in accordance with the method of the present invention. The first catalyst portion, designated as catalyst "12" in Table II, and data point 12 in the accompanying figure, was prepared from alumina spheres which had been dried at a temperature of about 100° C., and treated with moist hydrogen to a temperature of 500° C. for a period of one hour. As hereinbefore set forth, dry hydrogen was passed through water at a temperature of 60° C. prior to contacting the alumina spheres, and therefore contained about 20.0 mol percent water. The hydrogen-treated spheres were subsequently calcined at a temperature of 650° C., and thereafter impregnated with an aqueous solution of chloroplatinic acid containing 10 milligrams of platinum per milliliter in an amount to yield a final catalyst containing 0.725% by weight of platinum. The second catalyst portion, designated as catalyst "13" in Table II, and data point 13 in the accompanying drawing, was prepared by treating dried, uncalcined alumina spheres with moist hydrogen, containing 7.3% by weight of water, to a temperature of 600° C. Dry hydrogen was passed through water at 40° C., and the moist hydrogen through the alumina spheres at a rate of 300 cc. per minute. The hydrogen-treated spheres were then calcined in an atmosphere of air at a temperature of 650° C., for a period of three hours. The calcined alumina spheres were impregnated with an aqueous solution of chloroplatinic acid containing 10 milligrams of platinum per milliliter in an amount to yield a final catalytic composite containing 0.710% by weight of platinum. The two catalyst portions, "12" and "13," were individually subjected to the activity-stability test hereinabove described. The results of these tests are given in Table II, along with the results obtained upon the reference catalyst, designated as catalyst "5."

*Table II*

| Catalyst designation | 5 | 12 | 13 |
|---|---|---|---|
| Analysis: | | | |
| Platinum, weight percent | 0.750 | 0.725 | 0.710 |
| Fluoride, weight percent | 0.350 | | |
| Chloride, wieght percent | 0.310 | 0.900 | 0.800 |
| Total halide, weight percent | 0.660 | 0.900 | 0.800 |
| Carbon on tested catalyst, weight percent | 0.32 | 0.35 | 0.32 |
| Octane rating of product, F-1 | 95.0 | 95.9 | 95.0 |
| Excess receiver gas, s.c.f./bbl | 861 | 948 | 968 |
| Excess debutanizer gas, s.c.f./bbl | 442 | 425 | 414 |
| Total excess gas, s.c.f./bbl | 1,303 | 1,373 | 1,382 |
| Debutanizer gas ratio | 0.339 | 0.310 | 0.300 |
| Vol. percent yield, pentanes and heavier | 69.7 | 69.2 | 70.6 |
| Debutanizer gas at octane rating | 100 | 91 | 93 |
| Debutanizer gas at total gas | 100 | 86 | 83 |

For the purpose of having a clear understanding of the data, several definitions are presented below:

(1) The "excess reeciver gas" is that quantity of gas over and above the amount required to maintain the desired presure within the reaction zone, as well as the prescribed hydrogen to hydrocarbon mol ratio. Analyses have shown that this gas is, for all practical purposes, substantially pure hydrogen (approximately 95 mol percent).

(2) The "excess debutanizer gas" is that gas which is composed of light paraffins, generally methane, ethane, propane and butane, resulting to a great extent from the hydrocracking reaction being effected within the reaction zone.

(3) The "debutanizer gas ratio" is the ratio of excess debutanizer gas to total excess gas, is indicative of the balance effected among the various reactions, and illustrates the relative yield of desirable product in the effluent from the reaction done—i.e. the lower the ratio, the greater the yield of liquid product.

(4) The "debutanizer gas at equivalent octane rating" is an arbitrary activity number employed to compare the relative stability of catalysts. The "debutanizer gas at equivalent total gas production" is similarly utilized. For the reference catalyst, designated as catalyst "5," these numbers are obviously 100. A catalyst which exhibits an activity number for debutanizer gas greater than the reference catalyst, at the same octane rating or total gas production, is considered to possess a lesser degree of stability.

As indicated in Table II, a catalyst prepared on alumina spheres manufactured in accordance with the present invention, catalysts "12" and "13," although containing lesser quantities of the catalytically active metal component (platinum) exhibit a significantly lower debutanizer gas ratio than the reference catalyst. This is further illustrated upon comparing the volumetric yields of pentanes-and-heavier hydrocarbons obtained when utilizing catalysts "13" and reference catalyst "5." The octane rating observed on the product from these two catalysts is the same, and although catalyst "13" contained a lesser quantity of platinum, there was an increase in the liquid yield of about 1.0% by volume. It should be observed that, although the catalysts prepared in accordance with the process of the present invention indicate a higher degree of activity, the carbon deposition was virtually identical to that of the reference catalyst. In addition, the catalyst of the present invention indicated about 7% to 9% less debutanizer gas at the same octane rating, and similarly, 14% to 17% less debutanizer gas when considering the total gas production.

EXAMPLE III

Three additional catalyst portions were prepared in accordance with the method of the present invention, employing moist hydrogen, containing 7.3% by weight of water, to a temperature of 500° C. The treated alumina spheres were calcined and impregnated with a quantity of an aqueous solution of chloroplatinic acid containing 10 milligrams of platinum per milliliter to yield a final composite having 0.696 weight percent platinum. These three catalysts, designated as catalyst samples "9," "10" and "11" in the following Table III, and as datum points 9, 10 and 11 in the accompanying drawing, were individually subjected to the activity-stability test hereinbefore described. The liquid hourly space velocity, during the activity-stability test was purposefully varied in order to obtain three additional yield-octane relationships in order to define a yield-octane curve with previous catalyst samples "12" and "13."

*Table III*

| Catalyst designation | 9 | 10 | 11 |
|---|---|---|---|
| Activity test space velocity | 1.0 | 1.5 | 2.0 |
| Catalyst composition, weight percent: | | | |
| Platinum | 0.696 | 0.696 | 0.696 |
| Fluoride | | | |
| Chloride | 0.83 | 0.83 | 0.83 |
| Total combined halogen | 0.83 | 0.83 | 0.83 |
| F-1 clear octane rating | 100.1 | 97.9 | 95.4 |
| Vol. percent yield, pentanes and heavier | 61.2 | 65.7 | 69.7 |
| Excess receiver gas, s.c.f./bbl | 976 | 961 | 941 |
| Excess debutanizer gas, s.c.f./bbl | 541 | 475 | 421 |
| Total gas, s.c.f./bbl | 1,517 | 1,436 | 1,362 |
| Debutanizer gas ratio | 0.357 | 0.331 | 0.309 |
| Debutanizer gas at octane | 91 | 91 | 92 |
| Debutanizer gas at total gas | 89 | 88 | 87 |

The yield-octane relationship of catalyst samples "9," "10," "11," "12" and "13" are indicated in the accompanying figure by datum points 9, 10, 11, 12 and 13. Through these points is drawn the broken curve designated as "wet hydrogen catalyst." As hereinbefore indicated, in reference to the solid line representing the "reference catalyst" of Example II, the catalysts prepared in accordance with the present invention follow the established principle that, to achieve an increase in octane rating, there is necessarily suffered a decrease in the volumetric yield of liquid product having the desired higher octane rating. However, it is immediately noted that the catalyst of the present invention will produce a greater volumetric yield at the same octane rating, or conversely a greater octane rating when operating to produce the same volumetric yield. As noted in the accompanying drawings, if operating to produce a constant octane number of 98 F-1 clear, the reference catalyst results in a volumetric yield of about 63.7% whereas the catalyst of the present invention results in a volumetric yield of about 65.7%. As indicated in Tables II and III, the catalysts of the present invention were designedly prepared to be of varying composition, particularly with respect to the concentration of the catalytically active metallic component. Since the yield-octane relationship, designated in the drawing by the broken curve, is a smooth curve through the points representing the catalyst of the present invention, it is evident that the beneficial results are attributed solely to the method of manufacture, that of employing moist hydrogen. The catalysts of the present invention are shown as resulting in a significantly more advantageous yield-octane relationship, and, as previously indicated in Example I, the catalysts possess greater tendency to resist wear through abrasion, crushing, etc. Therefore, catalyst prepared on alumina which has been treated with moist hydrogen, can be employed at lower severities of operation while producing results comparable to, or better than, those catalysts prepared through the use of more common procedures. Obviously, there inherently results a catalyst which is more stable during operation and thus capable of performing its intended function for an extended period of time. This is further substantiated by the debutanizer gas ratios and the activity coefficients employed to compare the debutanizer gas at equivalent octane ratings and at equivalent total gas productions. For convenience in making this comparison, the data relative to the debutanizer gas is repeated in the following abbreviated Table IV.

*Table IV*

DEBUTANIZER GAS COMPARISON

| Catalyst designation | 5 | 9 | 10 | 11 | 12 | 13 |
|---|---|---|---|---|---|---|
| Debutanizer gas ratio | 0.339 | 0.357 | 0.331 | 0.309 | 0.310 | 0.300 |
| Activity coefficients: | | | | | | |
| Deb. gas at octane | 100 | 91 | 91 | 92 | 91 | 93 |
| Deb. gas at total gas | 100 | 89 | 88 | 87 | 86 | 83 |

It is seen that in every instance, the activity coefficients for the catalyst of the present invention are lower than that of the reference catalyst, indicating that a more favorable balance is effected among the reactions and resulting in an increase in ultimate liquid product yield. The debutanizer gas production, either at equivalent octane ratings, or equivalent total gas production, is about 9% to about 17% less than that experienced with the reference catalyst. In addition it is noted that the debutanizer gas ratios are, with the exception of catalyst "9," less than the gas ratio experienced with the reference catalyst. It must be remembered, however, that catalyst "9" was tested at conditions which produced a liquid product having an octane rating greater than 100.0.

The foregoing specification and examples clearly illustrate the method of the present invention and the benefits to be afforded through the utilization thereof. It is not intended that the present invention be unduly limited beyond the scope and spirit of the appended claims.

I claim as my invention:

1. A method for manufacturing a catalytic composite comprising a refractory inorganic oxide and a catalytic metal component, which method comprises preparing refractory inorganic oxide particles, drying said particles at a temperature less than about 212° F., contacting the resultant dried particles with wet hydrogen, containing from about 5.0 mol percent about 20.0 mol percent of water, at a temperature in excess of about 400° C., subjecting the hydrogen-treated particles to high-temperature calcination in an atmosphere of air, and thereafter combining said catalytic component with the calcined refractory inorganic oxide particles.

2. The method of claim 1 further characterized in that said catalytic component comprises platinum.

3. The method of claim 1 further characterized in that said catalytic component comprises palladium.

4. The method of claim 1 further characterized in that said refractory inorganic oxide is alumina.

5. A method for manufacturing a catalytic composite comprising alumina and platinum, which method comprises preparing alumina particles, drying said particles at a temperature less than about 212° F., contacting the resultant dried alumina particles with a stream of moist hydrogen, containing from about 5.0 mol percent to about 20.0 mol percent of water, at a temperature in excess of 400° C., thereafter impregnating the alumina particles with a platinum-containing compound to yield a final catalytic composite containing from about 0.1% to about 2.0% by weight of platinum, and calcining the impregnated alumina at a temperature above 400° C.

6. A method for manufacturing a catalytic composite comprising alumina and platinum, which method comprises preparing alumina particles, drying said particles at a temperature less than about 212° F., contacting the resultant dried alumina particles with a stream of moist hydrogen, containing from about 5.0 mol percent to about 20.0 mol percent of water, at a temperature in excess of 400° C., subjecting the thus hydrogen-treated alumina particles to high-temperature calcination in an atmosphere of air, impregnating the resultant calcined alumina particles with a platinum-containing compound to yield a final catalytic composite containing from about 0.1% to about 2.0% by weight of platinum, and thereafter calcining the impregnated alumina particles at a temperature in excess of about 400° C.

References Cited in the file of this patent
UNITED STATES PATENTS

| | | |
|---|---|---|
| 2,438,584 | Stewart | Mar. 30, 1948 |
| 2,698,305 | Plank et al. | Dec. 28, 1954 |
| 2,908,654 | Heinemann et al. | Oct. 13, 1959 |